United States Patent [19]

Hatono et al.

[11] Patent Number: 4,693,614
[45] Date of Patent: Sep. 15, 1987

[54] APPARATUS FOR DETECTING SLAG OUTFLOW

[75] Inventors: Akio Hatono, Suita; Sumio Kobayashi, Yamato-Koriyama, both of Japan

[73] Assignee: Sumitomo Metal Industries, Ltd., Osaka, Japan

[21] Appl. No.: 861,110

[22] Filed: May 6, 1986

Related U.S. Application Data

[63] Continuation of Ser. No. 622,287, Jun. 19, 1984, abandoned.

[30] Foreign Application Priority Data

| Jun. 20, 1983 | [JP] | Japan | 58-111423 |
| Jun. 20, 1983 | [JP] | Japan | 58-111424 |
| Nov. 16, 1983 | [JP] | Japan | 58-214020 |

[51] Int. Cl.⁴ ............... G01J 5/00; B22D 11/10
[52] U.S. Cl. ................................ 374/122; 374/120
[58] Field of Search ............ 266/78, 87, 99; 164/437, 449; 343/772, 775, 779, 780, 753–755; 250/432 R, 573; 374/120–122, 124–126, 130, 139

[56] References Cited

U.S. PATENT DOCUMENTS

| 2,588,610 | 3/1952 | Boothroyd et al. | 343/753 |
| 2,994,873 | 8/1961 | Goubau | 343/753 |
| 3,396,397 | 8/1968 | Kott | 343/754 |
| 3,446,074 | 5/1969 | Thomas | 374/122 |
| 3,465,339 | 9/1969 | Marner | 374/122 |
| 3,815,139 | 6/1974 | Lewis et al. | 343/781 |
| 3,842,421 | 10/1974 | Rootsey et al. | 343/779 |
| 3,842,894 | 10/1974 | Southworth et al. | 164/449 |
| 3,935,895 | 2/1976 | Eastner | 164/437 |
| 4,210,023 | 7/1980 | Sakamoto et al. | 73/290 R |
| 4,235,107 | 11/1980 | Lüdete et al. | 374/122 |
| 4,407,292 | 10/1983 | Edrich | 374/122 |

FOREIGN PATENT DOCUMENTS

| 0033308 | 8/1981 | European Pat. Off. | |
| 0035488 | 9/1981 | European Pat. Off. | |
| 3129217 | 8/1983 | Fed. Rep. of Germany | |
| 2514894 | 4/1983 | France | 266/99 |
| 56-122656 | 9/1981 | Japan | |
| 57-121864 | 7/1982 | Japan | |
| 126710 | 7/1984 | Japan | 266/99 |
| 129382 | 7/1984 | Japan | 266/99 |
| 610360 | 10/1948 | United Kingdom | 343/781 |

OTHER PUBLICATIONS

European Search Report No. EP 84 30 4142.

Primary Examiner—Charles Frankfort
Assistant Examiner—W. Morris Worth
Attorney, Agent, or Firm—Burns, Doane, Swecker & Mathis

[57] ABSTRACT

An apparatus for detecting slag outflow when a molten metal covered by molten slag is poured from one vessel to another by receiving the thermal radiation energy at the microwave frequencies emitted from the pouring stream of the molten metal from said one vessel to another to measure a change in thermal radiation energy caused by the difference in the emissivity of the molten metal and of the molten slag is disclosed. The apparatus comprises; a microwave-focusing mechanism which has a focal point at the measuring target point; a waveguide means one end of which is connected to said microwave-focusing mechanism and which receives the thermal radiation energy from said microwave-focusing mechanism; and a radiometer connected to the other end of said waveguide means to measure the thermal radiation energy at microwave frequencies received through said waveguide means.

3 Claims, 10 Drawing Figures

Fig. 3
Fig. 4
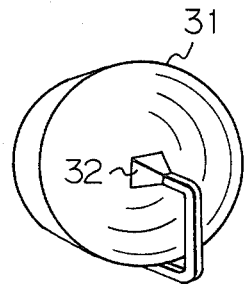
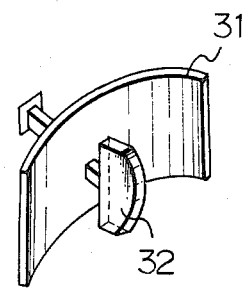
Fig. 6
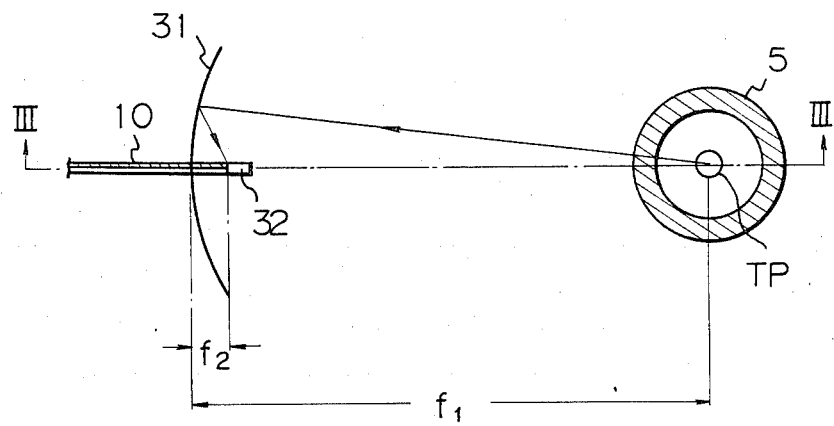

APPARATUS FOR DETECTING SLAG OUTFLOW

This application is a continuation of application Ser. No. 622,287, filed June 19, 1984, now abandoned.

BACKGROUND OF THE INVENTION

This invention relates to an apparatus for detecting the outflow of molten slag placed on the surface of a molten metal, usually molten steel, during continuous casting. In particular, this invention relates to an apparatus for detecting the outflow of molten slag into a tundish or a casting mold through a refractory sealing member when the molten metal is being poured from a ladle into a tundish or from a tundish into a casting mold under sealed conditions in a continuous casting process.

After finishing steel refining in a converter, the resulting molten steel is stored in a ladle and then carried to a continuous casting apparatus, where the molten steel is poured by way of a tundish into a mold and solidified into semi-finished products such as slabs, blooms or billets. While molten steel is in the ladle, the surface thereof is covered by a floating molten slag which serves to suppress the oxidation of the molten steel and also to maintain the temperature thereof If the molten slag flows out into a tundish together with the molten steel, the slag will be entrained and poured into a casting mold together with the molten steel. The thus entrained slag forms non-metallic inclusions in the cast slab, degrading the quality thereof. Therefore, in view of the necessity of quality control of cast slab and casting operation control, it is desirable to detect the outflow of slag through a nozzle from a ladle into a tundish or from a tundish into a casting mold in order to reduce as much as possible the amount of slag entrained into cast slabs. The pouring from a ladle into a tundish is stopped at once when the slag outflow is detected.

The conventional methods used to detect the outflow of slag include, other than a visual observation method, a direct-sight method employing a radiant heat thermometer (Japanese Patent Application Laid-Open No. 72752/1982), a method of measuring a change in the impedance of coils surrounding a nozzle down which molten steel flows, the change in impedance being caused by the difference in electrical conductivity of molten steel and molten slag which flow down through the nozzle (Japanese Patent Application Laid-Open Nos. 64961/1980, 122656/1981 and 167066/1983), and a method of measuring the vibration of a tundish and nozzle (Japanese Patent Application Laid-Open Nos. 97846/1980 and 97847/1980).

Recently, a sealed casting process has been proposed for the purpose of reducing the amount of inclusions in a cast slab, and in this process a poured stream of molten steel from a ladle into a tundish is covered or surrounded by a refractory sealing member and the inside thereof is filled with an inert gas such as Ar gas to suppress oxidation of the poured flow of molten steel. Alternatively, a long nozzle of the immersing type is provided at the bottom of a sliding nozzle and the opposite end of this immersing-type nozzle is plunged into molten steel in a tundish so as to avoid contact between the poured stream of molten steel and atmospheric oxygen. The sealed casting process is therefore effective to suppress oxidation of molten steel so as to reduce the amount of inclusions in a cast slab. In case the sealed casting process is employed, however, it is impossible to apply a visual observation method and a direct-sight method to detect slag outflow, because a poured stream of molten steel or slag is not exposed to the atmosphere and cannot be seen directly. In addition, the nozzle for use in the sealed casting process is made of alumina graphite which exhibits a high level of strength and heat resistance and also a remarkable resistance to heat erosion. However, alumina graphite has a high level of electrical conductivity, and the above-mentioned coil impedance measuring methods cannot be applied.

The inventors of this invention disclosed in Japanese patent application Laid-Open No. 121864/1982 a process to detect the outflow of slag by means of measuring the thermal radiation energy at the microwave frequencies by a radiometer (i.e. high sensitive receiver) to determine the outflow of molten slag on the basis of the difference in the emissivity of molten steel and of molten slag when they flow out from a ladle or a tundish through a refractory sealing member.

However, according to the above-mentioned method, the thermal radiation energy is received by an antenna in the shape of horn and it is necessary to place the antenna as close to the refractory sealing member as possible.

It is the current trend to employ a continuous casting process of the multi-strand type. When such a multi-strand process is employed, it is necessary to frequently and quickly replace or change the ladle and tundish, and sampling operations are also required frequently, and therefore, many operations must be carried out near the ladle and tundish. This means that the method proposed above of detecting outflow of slag is impractical, because it is necessary to install an antenna in the shape of a horn very near the nozzle (usually 30–50 mm away from the nozzle). The installation of this equipment interferes with the operations of changing ladles or tundishes and the operation of other apparatuses or appendixed devices. Therefore, it has been thought that it is difficult to install such apparatuses near a continuous casting apparatus, especially one employing the sealed casting process of the multi-strand type.

In addition, even in the afore-mentioned conventional methods, such as a direct-sight method, a coil-impedance measuring method and a vibration-measuring method, a radiant thermometer, coil, vibration sensor, etc. have to be installed near a measuring target point, i.e. a target point of measurement where a stream of molten steel flows down.

Therefore, there is a great need in the industry for an apparatus through which the outflow of slag can be detected at a distance of at least a few meters away from the measuring target point.

SUMMARY OF THE INVENTION

The primary object of this invention is to provide an apparatus for detecting the slag outflow at a distance of at least a few meters away from an area where the pouring of molten metal is taking place.

Another object of this invention is to provide an apparatus for detecting the slag outflow at a distance without interfering with the operations of other devices, such as ladles, tundishes, or their attachment devices.

Still another object of this invention is to provide an apparatus for use in a sealed casting process for detecting slag outflow at a distance.

The inventors have tried to find another mechanism to detect the difference between molten steel and molten slag under sealed conditions at a distance of at least a few meters away, and have confirmed that the microwave measuring method is most desirable at present. The inventors also carried out an extensive study on how to catch the microwaves efficiently at a distance of at least a few meters away from the pouring stream. Unexpectedly, the inventors found that it is possible to receive the thermal radiation energy by a microwave-focusing mechanism which is provided at a distance and successfully receives the thermal radiation energy on a radiometer.

According to the findings of the inventors, the microwave-focusing mechanism which has a focal point at the measuring target point is effective in detecting the outflow of slag into a tundish or a casting mold during continuous casting.

Thus, this invention resides in an apparatus for detecting slag outflow when a molten metal covered by molten slag is poured from one vessel to another by receiving the thermal radiation energy at the microwave frequencies emitted from the pouring stream of the molten metal from said one vessel to another to measure a change in thermal radiation energy caused by the difference in the emissivity of the molten metal and of the molten slag, which comprises;

a microwave-focusing mechanism which has a focal point at the measuring target point;

a waveguide means one end of which is connected to said microwave-focusing mechanism and which receives the thermal radiation energy from said microwave-focusing mechanism; and a radiometer connected to the other end of said waveguide means to measure the thermal radiation energy at microwave frequencies received through said waveguide means.

In one embodiment of this invention, said microwave-focusing mechanism may be a high gain reflector type antenna which is composed of a reflector and a feed, the reflector having an elliptical curvature and being arranged such that one focal point is at the measuring target point. An ellipsoidal-type reflector or an elliptical, cyclindrical reflector is successfully employed as a reflector, and a horn antenna or a pill-box antenna is advantageously employed as a feed.

In another embodiment of this invention said microwave-focusing mechanism may be a lens antenna which is composed of a microwave lens and a receiving antenna, and the focal point of said lens is set at the measuring target point. A dielectric lens is successfully employed as a lens, and a high gain reflector type antenna is successfully employed as a receiving antenna.

Thus, in one aspect, this invention resides in an apparatus for detecting the slag outflow, when molten metal is poured from one vessel to another vessel, by receiving the thermal radiation energy emitted from the pouring stream of the molten metal from said one vessel to another to measure the change in the thermal rediation energy caused by the difference in the emissivity between molten metal and molten slag, which comprises;

a high gain reflector type antenna as a microwave-focusing mechanism composed of a reflector and a feed, said reflector having a reflecting surface of an elliptical curvature arranged such that one focal point is set at the measuring target point;

a waveguide means one end of which is connected to said antenna and which receives the thermal radiation energy from said microwave-focusing mechanism; and a radiometer connected to the other end of said waveguide means.

In another aspect, this invention resides in an apparatus for detecting the slag outflow, when molten metal is poured from one vessel to another vessel, by receiving the thermal radiation energy emitted from the pouring stream of the molten metal from said one vessel to another to measure the change in the thermal radiation energy caused by the difference in the emissivity between the molten metal and the molten slag, which comprises;

a lens antenna as a microwave-focusing mechanism composed of at least one microwave lens arranged such that the focal point of it is set at the measuring target point, and a receiving antenna placed on the opposite side of said focal point with respect to said microwave lens;

a waveguide means one end of which is connected to said receiving antenna and which receives the thermal radiation energy from said receiving antenna; and a radiometer connected to the other end of said waveguide means to measure the thermal radiation energy received through said waveguide means. When a series of microwave lenses are used, the first objective lens is placed away from the measuring target point at a distance of its focal length.

Furthermore, the provision of a purge means and/or microwave-transparent filter at a suitable position on said waveguide means may be desirable in order to cool the radiometer or to remove dust so that the receiving sensitivity may be markedly improved.

Herein, the "measuring target point" means a place where a physical change is taking place, e.g., a central area of a nozzle of a ladle or tundish through which molten steel is poured into a tundish or a casting mold, preferably under sealed conditions. The distance between the measuring target point and the microwave focusing mechanism is desirably at least several meters.

Thermal radiation energy P (watt) received by a microwave radiometer can be expressed by the following formula:

$$P = k \cdot T \cdot f \quad (1)$$

wherein, "k" is the Boltzmann's constant ($=1.38 \times 10^{-23}$ J/K), "f" is the bandwidth of the receiving radiometer (1/sec), and "T" is a brightness temperature.

The brightness temperature T (°K) can be expressed by the following formula:

$$T = \epsilon_T \cdot T_T \quad (2)$$

wherein, $T_T$(°K) is a physical temperature of the object and $\epsilon_T$ is an emissivity of the object ($\epsilon_T < 1$).

As is apparent from the foregoing, it is possible to determine the difference in emissivity between a molten metal and slag on the basis of the difference in their thermal radiation energies. Since the thermal radiation energy can be transmitted through a refractory material, such as alumina, alumina silica, or the like, which are highly transparent with respect to microwaves, it is possible to detect such differences in thermal radiation energy caused by slag outflow from a ladle to a tundish or from a tundish to a casting mold, from the outside of the refractory sealing member even under sealed conditions.

BRIEF DESCRIPTION OF THE DRAWINGS

FIGS. 3 and 4 show different combinations of a reflector and a feed which may be employed in the apparatus of this invention;

FIG. 6 is a view of the apparatus of FIG. 5 taken along line IV—IV of FIG. 5;

DETAILED DESCRIPTION OF THE PREFERRED EMBODIMENTS

This invention will be described with reference to a continuous casting process where molten steel is poured into a tundish under sealed conditions. However, it is to be understood that this invention is not limited to this particular case in any way.

Figure 1:
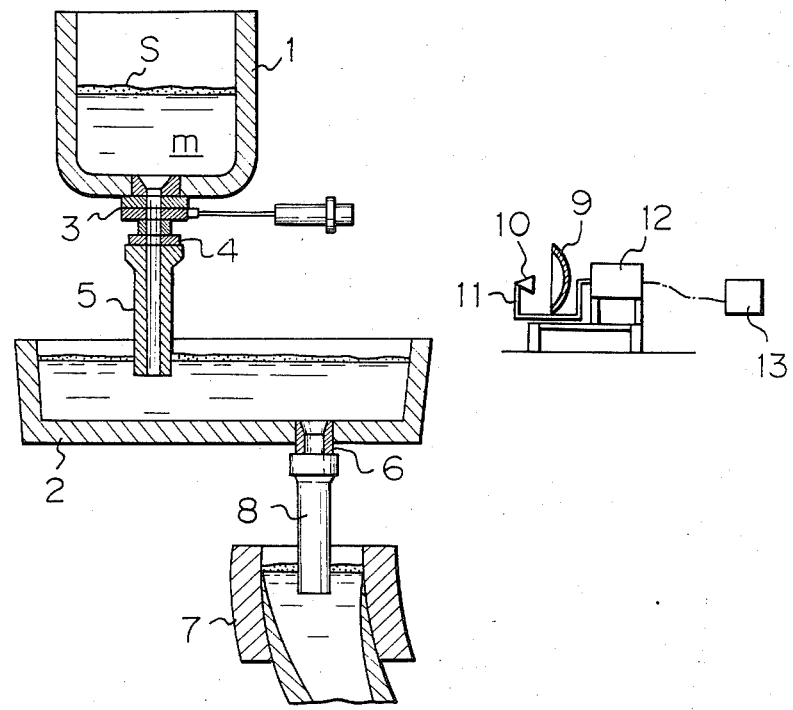
FIG. 1 is a schematic view illustrating an arrangement of the apparatus of this invention.

FIG. 1 shows one embodiment of this invention, in which the microwave-focusing mechanism is a high gain reflector type antenna composed of a reflector and a feed.

In FIG. 1, a ladle 1 is connected to a tundish 2 through a sliding nozzle 3 fixed to the bottom of the ladle and an immersing-type nozzle 5 fixed to the end of the sliding nozzle 3 with a sealing member 4. The other end of the immersing nozzle 5 is immersed in molten steel in the tundish 2. Thus, molten steel (m) in the ladle 1 is poured into the tundish 2 under non-oxidizing conditions. In order to prevent oxidation of the surface of the molten steel in the ladle and to maintain the temperature of the molten steel, a molten slag (s) is placed thereon.

As shown in FIG. 1, the tundish 2 is also provided with a tundish nozzle 6 at the bottom thereof. To the other end of this tundish nozzle 6 an immersing-type nozzle 8 is attached. The tip of this immersing nozzle 8 is immersed in molten steel in a casting mold 7. Thus, molten steel may be poured into a casting mold 7 under sealed conditions.

A reflector 9 such as a ellipsoidal-type reflector and a elliptical, cylindrical reflector is placed facing towards the immersing nozzle 5 with the focal point thereof being set at the point where the molten steel flows down within the nozzle 5. A feed 10 is provided facing the reflector 9 at the other focal point of this reflector 9. Therefore, the thermal radiation energy at microwave frequencies emitted from the measuring target point is reflected by the reflector 9, and received by the feed 10, and a radiometer 12 connected to this feed 10 by way of a waveguide 11, and the thermal radiation energy of molten steel (m) or slag (s) flowing down within the immersing nozzle 5 is measured. The outflow of the molten slag during pouring can be detected by using this radiometer on the basis of the change in the thermal radiation energy.

The radiometer may preferably contained in a box and kept at constant temperature so as to be unaffected by the heat emitted from cast slabs, for example, during operation.

Reference numeral 13 indicates a recorder connected to the radiometer to record the data measured by the radiometer.

Figure 2:
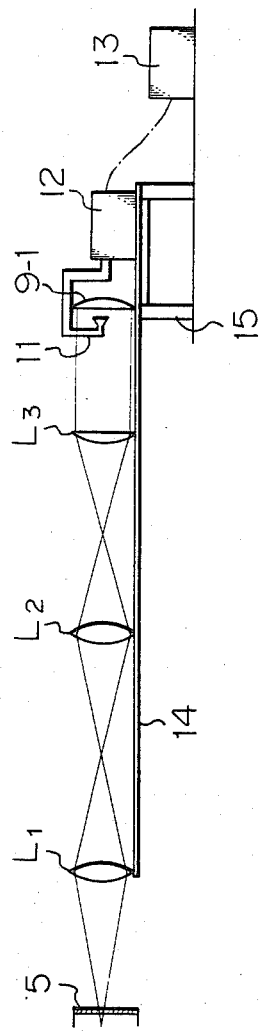
FIG. 2 shows another arrangement of a set of microwave lenses which may be used in the apparatus of this invention.

FIG. 2 shows another arrangement of the apparatus of this invention.

The same members as in FIG. 1 are indicated by the same reference numerals. According to the arrangement shown therein, the microwave-focusing mechanism is a lens antenna which is composed of microwave lenses $L_1$–$L_3$ and a receiving antenna 9-1. A microwave lens $L_1$ such as a dielectric lens and a metal lens is placed facing towards the immersing nozzle 5 with the focal point thereof being set at the point where the molten metal steel flows down within the nozzle 5. On the opposite side of this focal point of the microwave lens with respect ot the microwave lenses a receiving antenna 9-1 is provided facing the microwave lenses. The receiving antenna is one which can receive the thermal radiation energy emitted from the measuring target point that comes through the microwave lenses. Therefore, the thermal rediation energy emitted from the measuring target point come through a set of microwave lenses $L_1$, $L_2$ and $L_3$, a receiving antenna 9-1, and a radiometer 12 connected to this receiving antenna 9-1 by way of a waveguide 11, and the thermal radiation energy emitted from molten steel (m) or slag (s) flowing down within the immersing nozzle 5 can be precisely detected at a distance, and the outflow of slag can be checked on the basis of the change in the thermal radiation energy.

The microwave lenses $L_1$–$L_3$ are, as shown in FIG. 2, supported by an arm 14 extending towards the immersing nozzle 5 from a support base 15 of the receiving antenna 9-1 and radiometer 12. The arm 14 is arranged in a slidable manner and can be fixed at a suitable position, so that the focal point of the microwave lens $L_1$ can be set at the exact point where molten steel flows down. That is, the lens may be placed a focal length away from the measuring target point.

More microwave lenses may be used depending on the distance from the measuring target point to the first objective microwave lens $L_1$.

FIG. 3 shows one example of a combination of a reflector 31 and a feed 32, in which the reflector 31 is of an ellipsoidal-type reflector and the feed 32 is a horn antenna. FIG. 4 shows another example in which the reflector 31 is in an elliptical, cylindrical shape and has a uniform semi-elliptical horizontal cross section over its entire height and the feed 32 is of the pill-box horn type.

Figure 5:
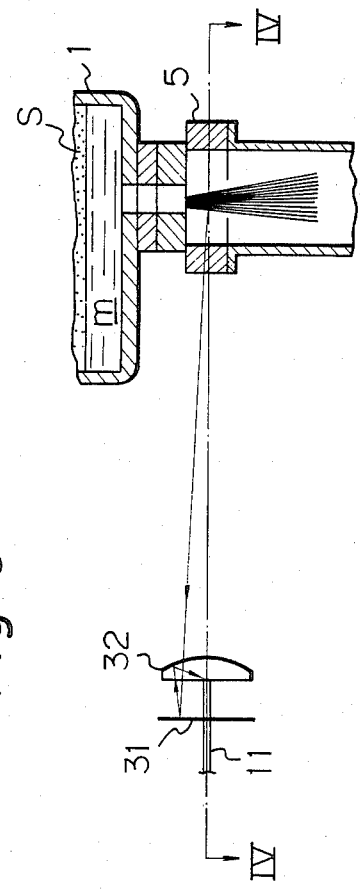
FIG. 5 shows another embodiment of the microwave-focusing mechanism composed of a reflector and a feed of this invention.

FIGS. 5 and 6 show another embodiment of this invention, in which the microwave-focusing mechanism is composed a reflector 31 and a feed 32. The elliptical, cylindrical reflector 31 is arranged such that one focal length $f_1$ is the same as the distance from the measuring target point to the reflector 31 and the other focal length $f_2$ is the distance from the feed to the reflector 31. In this case, the feed 32 is a pill-box antenna.

Thermal radiation energy emitted from inside the nozzle 5 at the measuring target point indicated by TP in FIG. 6 is reflected off the reflector 31 towards the feed 32 as shown by the arrows in FIGS. 5 and 6. The microwaves which are concentrated in this manner are then transmitted through a waveguide means 11 to a radiometer (not shown in FIGS. 5 and 6).

Figure 7:
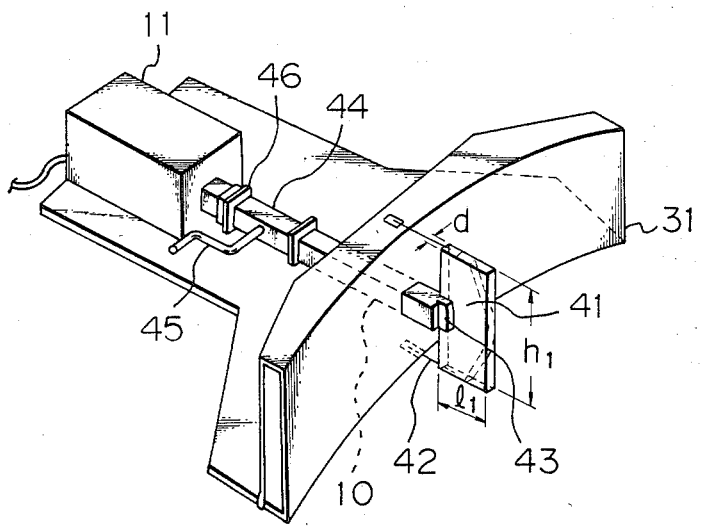
FIG. 7 is a perspective view of a combination of a reflector with a feed.

As shown in more detail in FIG. 7, the pill-box type feed 41 is fixed to the elliptical, cylindrical reflector 31 with a frame 42 and is screwed to the waveguide means 10 at the central portion 43. At a suitable position of the waveguide means 10, e.g. at the end thereof as shown in the figure, a purge waveguide 44 comprising a purging mechanism to cool and remove dust is provided. A purge pipe 45 is connected to the purge waveguide 44 and a purge gas such as $N_2$ or Ar gas is supplied. The purge waveguide 44 is connected to a radiometer through a sealing filter 46 which may be a microwave-transparent plate, such as Teflon (tradename) plate, a poly(vinyl chloride) plate, or the like. The radiometer 11 is preferably of the zero adjustment type in which a standard noise generator is employed to avoid its being influenced by the internal noise of an amplifier or by the drift by means of offsetting the received power of the thermal radiation energy by the power of said standard noise generator.

The reflector 31 may be made of any suitable material, but from the standpoint of economy and ease of handling, it is preferable to use aluminium. The curvature of the reflector is prepared so that one focal length is at least a few meters long. When the surface of the reflector has an elliptical horizontal cross section as shown in FIG. 6, the apparatus is made compact. The pill-box type feed is also made of aluminium in a preferred embodiment. The focal point of the inner curvature of the pill-box type feed is so adjusted that it coincides with the aperture of said waveguide means.

It is desirable to concentrate the emitted energy at the aperture of said waveguide means in both the vertical and horizontal planes.

As shown in FIGS. 5 and 6, thermal radiation energy emitted from the sealed nozzle is concentrated by means of a reflector 31 onto the pill-box type feed 32 and then to the aperture of the waveguide means 10. As shown in FIG. 6, the thermal radiation energy diverging in the horizontal plane is focused by the surface of the reflector 31 onto the pill-box type feed 32 and then is reflected to the aperture of the waveguide means 10. On the other hand, as shown in FIG. 5, the thermal radiation energy divergent in the vertical plane is reflected by the surface of the reflector 31 and is concentrated onto the end portion of the waveguide means 10 by means of the pill-box type feed 32. Thus, according to the arrangement shown in the figures, the thermal radiation energy diverging not only in the horizontal but also in the vertical plane can efficiently be focused onto the waveguide means. The thus concentrated microwaves are transmitted through the waveguide and purge pipe 3 to the radiometer 4. In the figure, the arrows show the path of heat thermal radiation energy. Preferably, the focal points of the elliptical curvatures of the reflector 31 and of the pill-box type feed 32 are arranged so that the focal points may be ($f_2$, $f_1$) and ($f_2$, $-f_1$), respectively, as shown in FIG. 6, wherein $f_1$ is a distance between the measuring target point and the reflecting surface of the reflector 31 and $f_2$ is the distance between the reflecting surface of the reflector 31 and the aperture of the waveguide 3.

The structures of the waveguide means and the radiometer may be conventional ones.

This invention will be further described in conjunction with some working examples, which are presented merely for illustrative purposes and are not restrictive of this invention in any way.

EXAMPLE 1

In this example, an apparatus like that shown in FIGS. 5 and 6 was assembled to measure the thermal radiation energy emitted from the immersing nozzle 5. The specifications of this apparatus were as follows:
(i) Reflector 31:
　Material: Aluminium
　Shape: An ellipsoidal reflector 1.4 m wide and 0.24 m high
　Focal lengths: $f_1 = 3$ m, $f_2 = 0.4$ m
(ii) Feed 32:
　Shape: A pyramidal horn antenna 95 × 10.2 mm Opening
(iii) Radiometer:
　Frequency band: 8–12.4 GHz
　Type: Total power type
　RF gain: Approximately 50 dB The distance between the center portion of the immersing nozzle 5 and the reflector 31 was set at 3 meters. Using the apparatus arranged as in the above, the thermal radiation energy emitted from the molten steel or slag flowing down through the nozzle 5 was measured. Using this apparatus, the thermal radiation energy emitted from the molten steel or slag flowing down through the nozzle was measured.

According to this invention, the increase of the received energy was about 40 percent of the increase of the energy emitted from inside the nozzle. That is, since the difference in brightness temperature between the molten steel and slag was about 500° K., the increase in brightness temperature was 200° K. when it was received by the radiometer. Thus, the outflow of slag could be precisely detected by the radiometer 11 according to the apparatus of this invention.

Figure 8:
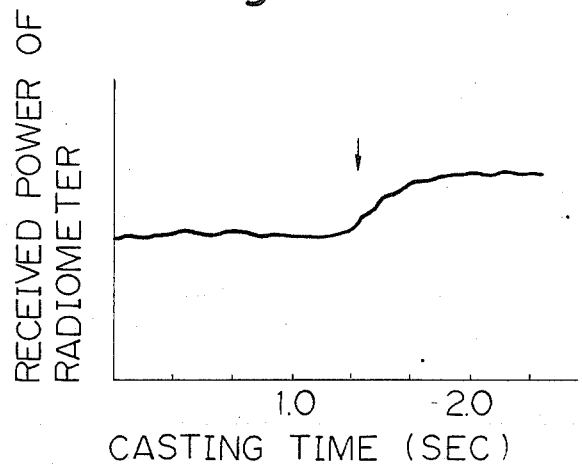
FIGS. 8-10 are graphs showing the change in output of the radiometer with respect to casting time based on experimental data obtained in the working examples of this invention.

The measured data are summarized in a graph in FIG. 8. The received power of the radiometer in the graph is relative one. At the point indicated by the arrow, the outflow of molten slag was successfully detected. In this experiment, the nozzle was not closed even after the outflow of slag was detected.

EXAMPLE 2

A slag outflow detecting apparatus as shown in FIG. 2 was assembled except that one microwave lens was used. The specifications of this apparatus were as follows:
(i) Microwave lens L:
　Shape: Plano-convex convergent lens attached to a supporting rectangular frame.
　Material: Boron nitride (Relative permittivity ≈ 4)
(ii) Receiving antenna 11:
　Shape: Parabolic antenna 210 mm in diameter.
　Depth: 20.3 mm
　Material: Aluminium
(iii) Radiometer 12:
　Frequency band: 8–12.4 GHz
　Type: Total power type receiver
　RF gain: Approximately 50 dB The distance between the immersing-type nozzle 5 and the microwave lens $L_3$ was set at 1 meter and the distance between the microwave lens $L_3$ and the receiving antenna 9-1 was set at 1.4 meters.

Figure 9:
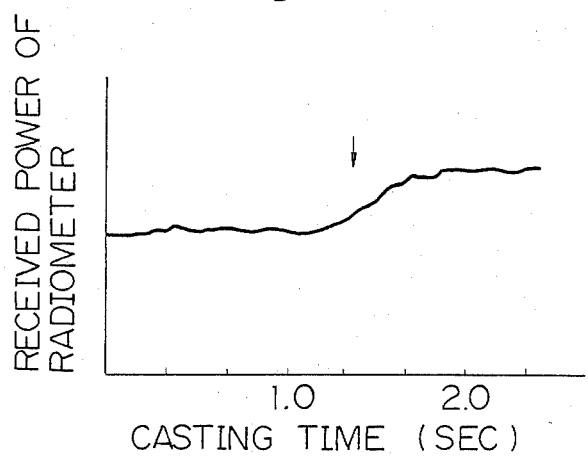

The measured data are summarized in a graph in FIG. 9. At the point indicated by the arrow, the outflow of molten slag was successfully detected. In this experiment, the nozzle was not closed even after the outflow of slag was detected.

EXAMPLE 3

A slag outflow detecting apparatus was assembled as shown in FIGS. 5 and 6, but this time the feed 41 shown in FIG. 7 was used in place of the receiving antenna 32. The specifications of the apparatus of this example were as follows:
(i) Reflector 31:
  Material: Aluminium
  Shape: An ellipitical, cylindrical reflector 1.4 m wide and 0.24 m high
  Focal lengths: $f_1 = 3$ m, $f_2 = 0.4$ m
(ii) Feed 41:
  Material: Aluminium
  Shape: Pill-box type feed
  Dimensions: $h_1 = 240$ mm, $d = 29.4$ mm, $l_1 = 84$ mm
  Focal lengths: $f_1 = 3$ m, $f_2 = 0.4$ m
(iii) Waveguide means:
  Material: Copper
  Microwave band available: 8–12.4 GHz
  Dimensions: 25.4 mm × 12.7 mm
(iv) Radiometer:
  Frequency band: 8–12.4 GHz
  Type: Total power type receiver
  RF gain: Approximately 50 dB The distance between the center portion of the immersing nozzle 5 and the reflector 31 was set at 3 meters. Using this apparatus, the thermal radiation energy emitted from the molten steel or slag flowing down through the nozzle was measured.

Figure 10:
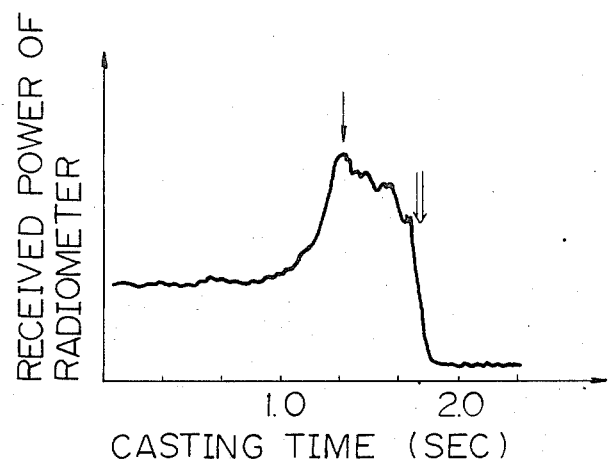

The measured data are summarized in a graph in FIG. 10. At the point indicated by the solid arrow, the outflow of molten slag was successfully detected. After the nozzle 5 was closed, the received power decreased rapidly as shown by the open arrow in FIG. 10.

Thus, as is apparent from the foregoing to those skilled in the art, employing the microwave-focusing mechanism to receive thermal radiation energy at the microwave frequencies which is emitted from the molten metal or slag flowing down through a nozzle under sealed conditions, it is possible to detect as precisely as in a conventional method in which a receiving antenna or radiometer is placed as close as 30–50 mm from the nozzle. As soon as the outflow of slag is detected, a sliding nozzle is closed to prevent the slag from going into the tundish or casting mold. In addition, a radiometer may be placed remote from the nozzle so that no special attention is necessary to protect the radiometer from high temperature exposure.

Although the invention has been described with reference to preferred embodiments, it is to be understood that variations and modifications may be employed without departing from the concept of this invention as defined in the following claims.

What is claimed is:

1. An apparatus for detecting slag outflow when a molten metal covered by molten slag is poured from one vessel to another vessel under sealed conditions by receiving the thermal radiation energy at the microwave frequencies emitted from the pouring stream of molten metal as it is poured from said one vessel to another to detect a change in thermal radiation energy caused by the difference in the emissivities of said molten metal and said molten slag, which comprises:

a microwave-focusing mechanism located at least one meter from said pouring stream composed of a plurality of microwave lenses arranged such that one focal point of one of said lenses is set at a measuring target point at said pouring stream, and a receiving antenna placed on a side of the focusing mechanism opposite to said measuring target point, said plurality of said microwave lenses being supported on a slidable arm extending toward the measuring target point wherein one end of said arm is fixed to a base on which said receiving antenna is mounted;

a waveguide means one end of which is connected to said receiving antenna and which receives the thermal radiation energy from said microwave-focusing mechanism; and said waveguide means being provided with a purge waveguide comprising a purging mechanism having a conduit from a purge gas source; and a radiometer connected to the other end of said waveguide means to measure the thermal radiation energy received through said waveguide means.

2. An apparatus as defined in claim 1 wherein said one vessel is a ladle and said another vessel is a tundish for use in continuous casting.

3. An apparatus as defined in claim 2 wherein said ladle is connected to the tundish by means of a nozzle through which molten steel is poured from the ladle to the tundish.

* * * * *